United States Patent [19]

Neuzil

[11] 3,855,333
[45] Dec. 17, 1974

[54] ADSORPTIVE SEPARATION OF AROMATIC ISOMERS WITH ADSORBENTS CONTAINING AN ALCOHOL SUBSTRATE

[75] Inventor: Richard W. Neuzil, Downers Grove, Ill.

[73] Assignee: Universal Oil Products Company, Des Plaines, Ill.

[22] Filed: Mar. 19, 1973

[21] Appl. No.: 342,658

[52] U.S. Cl. ............................ 260/674 SA, 208/310
[51] Int. Cl. ................................................ C07c 7/12
[58] Field of Search ............... 260/674 SA; 208/310

[56] References Cited
UNITED STATES PATENTS

| | | | |
|---|---|---|---|
| 3,558,732 | 1/1971 | Neuzil | 260/674 |
| 3,626,020 | 12/1971 | Neuzil | 260/674 |
| 3,668,267 | 6/1972 | Hedge | 260/674 |
| 3,686,343 | 8/1972 | Bearden et al. | 260/674 |

Primary Examiner—Delbert E. Gantz
Assistant Examiner—C. E. Spresser
Attorney, Agent, or Firm—James R. Hoatson, Jr.; Thomas K. McBride; William H. Page, II

[57] ABSTRACT

An adsorptive separation process for separating para-isomers from a hydrocarbon feed containing a mixture of aromatic isomers, including the para-isomer, which process employs a crystalline aluminosilicate adsorbent containing an alcohol substrate to selectively adsorb the para-isomer from the feed. The alcohol substrate substantially increases the selectivity of the adsorbent for the para-isomer with respect to the other aromatic isomers, thereby improving the efficiency of the separation process. In one specific embodiment the use of an alcohol substrate increases the selectivity of the adsorbent for para-xylene sufficiently to permit the use of a benzene-containing desorbent to remove the adsorbed para-xylene. Because of its lower boiling point, a benzene-containing desorbent avoids fractionation difficulties that may result when a toluene desorbent is used while processing a non-extracted $C_8$ aromatic feed stock.

19 Claims, 2 Drawing Figures

Figure 1

Figure 2

ADSORPTIVE SEPARATION OF AROMATIC ISOMERS WITH ADSORBENTS CONTAINING AN ALCOHOL SUBSTRATE

BACKGROUND OF THE INVENTION 1. adsorbent containing an Field of the Invention selectively adsorbed para-isomer is alcohol substrate. The from the The field of art to which the invention pertains is hydrocarbon separation and in particular this application relates to the separation of aromatic hydrocarbon isomers by selective adsorption on a solid crystalline aluminosilicate adsorbent containing an alcohol substrate. The selectively adsorbed para-isomer is removed from the adsorbent with a suitable desorbent.

2. Description of the Prior Art

It is well known in the separation art that certain absorbents generally comprising crystalline aluminosilicates can be utilized to separate certain hydrocarbons from mixtures thereof. In aromatic hydrocarbon separation, and in particular the separation of $C_8$ aromatic isomers, it is generally recognized that certain crystalline aluminosilicates containing selected cations at the zeolite cationic sites enhance the selectively of the zeolite for a given aromatic isomer with respect to other aromatic isomers thus permitting separation of the desired isomer by selective adsorption. Example of specific adsorbents may be found in my U.S. Pat. Nos. 3,558,730; 3,626,020; and 3,663,638; Bearden and DeFoe U.S. Pat. No. and Cattanach U.S. Pat. No. 3,699,182.

The absorbed isomer, which is usually the para-isomer, is then generally removed from the adsorbent with a suitable desorbent material. Such a desorbent must be capable of desorbing the adsorbed isomer without requiring large mass flow rates and yet it must be esily displaced from the adsorbent during a subsequent adsorption cycle. Additionally the desorbent must be easily separable from both adsorbed and nonadsorbed feed components to permit the recovery of high purity product streams and to permit the continuous reuse of the desorbent material. Since this separation is generally done by fractionation, it is preferred that the boiling point difference between the feed components and the desorbent material be sufficiently great to permit separation with reasonable fractionation equipment without requiring the more expensive high-efficiency fractionation columns.

Two such suitable desorbents which generally meet these requirements are toluene and diethylbenzene as I have disclosed in my U.S. Pat. Nos. 3,558,732 and 3,686,342. There are, however, some instances where fractionation difficulties can arise when tolune is employed as a desorbent. These difficulties occur when the adsorptive separation unit is processing a $C_8$ aromatic feed and the feed also contains naphthenes which boil in about the same range as the toluene desorbent. Such naphthenes will eventually contaminate the desorbent. In such circumstances the diethylbenzene desorbent can be successfully used since its boiling range is further removed from the boling range of naphthenes in the feed. Diethylbenzene is, however, not as readily available as is toluene.

Benzene is readily available and because of its relatively low boiling point (80°C. compared to 110°C. for toluene) would, in this respect, have an advantage over toluene as a desorbent in circumstances described above. Unfortunately, as I have described in U.S. Pat. No. 3,558,732, attempts to use it as a desorbent both diluted and undiluted have failed. This is due to the fact that when benzene is present in the adsorbent at high concentrations the selectivity for para-xylene with respect to the other $C_8$ aromatics is virtually destroyed.

By the process of the present invention I have found that the use of an alcohol substrate on particular absorbents substantially improves the para-selectivity with respect to the other $C_8$ aromatic isomers. The process of my invention therefore allows the use of a readily available benzene-containing desorbent which avoids the possible fractionation difficulties associated with toluene desorbent.

It has been recognized that certain compounds when contacted with zeolitic adsorbents will modify the characteristics of these adsorbents. For example, U.s. Pat. No. 3,106,593 teaches the use of $NH_3$ or basic nitrogen compounds such as amines to inhibit polymerization which may occur in the separation of olefins with certain absorbents. More germane to aromatic isomer separation, U.S. Pat. No. 3,698,157 teaches the use of an organic-radical substituted silane to modify the characteristics of a particular zeolite useful in separating individual $C_8$ aromatic isomers. In my co-pending application, Ser. No. 165,101, filed on July 26, 1971, now U.S. Pat. No. 3,734,974, I disclosed that the addition of small amounts of water to a particular adsorbent useful for xylene separation resulted in faster exchange rates and reduced ortho- and meta-xylene "tailing".

Alcohols have been broadly disclosed for use as desorbents to remove adsorbed species from adsorbents, as for example in my U.S. Pat. Nos. 3,558,730; 3,626,020; 3,668,638 and in DeRosset U.S. Pat. No. 3,665,046. The use of alcohols to modify the selectivity of an adsorbent for a particular feed component has, however, not been disclosed or suggested by the prior art.

SUMMARY OF THE INVENTION

It is, accordingly, a broad objective of my invention to provide a selective adsorption process for the separation of para-aromatic isomers from a feed stream containing a mixture of aromatic isomers including the para-isomer by increasing the selectivity of the adsorbent for the para-isomer with respect to the other aromatic isomers through the use of an alcohol substrate. Another more specific object is to provide an improved countercurrent simulated moving-bed selective adsorption process for the separation of para-xylene from a feed stream containing $C_8$ aromatic isomers including para-xylene. The improvement resides in increasing the selectivity of the adsorbent for para-xylene sufficiently to permit the use of a benzene-containing desorbent.

In brief summary, my invention is, in one embodiment a process for separating the para-isomer from a feed comprising a mixture of bi-alkyl substituted monocyclic aromatic isomers, including the para-isomer, which process comprises contacting said mixture with a crystalline aluminosilicate adsorbent containing barium at the exchangeable sites within the adsorbent crystalline structure at adsorption conditions including the presence of an alcohol substrate to effect the selective adsorption of said para-isomer by said absorbent and recovering from the adsorbent a stream concentrated in the para-isomer.

In another embodiment my invention is an improved adsorptive process for the separation of a para-isomer from a hydrocarbon feed comprising a mixture of aromatic isomers, including the para-isomer, which process comprises the steps of contacting the feed at adsorption conditions, with a crystalline aluminosilicate adsorbent selected from the group consisting of type x and type Y zeolites containing a selected cation or cations at exchangeable cationic sites within said zeolite, thereby adsorbing the para-isomer of the feed, in an adsorptive separation process for the separation of the para-isomer from a hydrocarbon feed comprising a mixture of aromatic isomers, including the para-isomer, which process comprises the steps of: (a) contacting the feed, at adsorption conditions, with a crystalline aluminosilicate adsorbent selected from the group consisting of type X and type Y zeolites containing a selected cation or cations at the exchangeable cationic sites within said zeolite, thereby adsorbing the para-isomer of the feed; (b) withdrawing from the bed of solid adsorbent a stream comprising less selectively adsorbed components of the feed; (c) contacting the adsorbent at desorption conditions with a desorbent material to effect the removal of the para-isomer from the desorbent; and, (d) withdrawing from the adsorbent bed a stream comprising desorbent material and said para-isomer; the improvement which comprises employing an alcohol substrate on the adsorbent.

Other embodiments and objects of the present invention encompass details about feed streams, adsorbents, desorbents and alcohol substrates, all of which are hereinafter disclosed in the following discussion of each of these facets of the present invention.

DETAILED DESCRIPTION OF THE INVENTION

Feed stocks which can be utilized in the process of this invention include bi-alkyl subsituted mono-cyclic aromatics having anywhere from eight up to about eighteen carbon atoms per molecule. Specifically, the feed stocks which can be used in the process of this invention are characterized by the formula 1 as shown below:

Formula 1

(1)

wherein $R_1$, $R_2$, $R_3$ and $R_4$ are selected from the group of aalkyl chains in a manner to allow an essentially bi-alkyl substitution at either ortho-, meta-, or para-isomer positions. The R substitutional groups can include alky groups ranging from methyl substitution groups up to and including chains having 11 or less carbon atoms per molecule. The alkyl side chains can be both normal and branched in nature.

Because separation of a desired aromatic isomer by selective adsorption on a zeolitic adsorbent apparently takes place because of the relative basicity of the various isomers and a rather delicate acidity/basicity difference between the desired isomer and the adsorbent, it is preferred that the alkyl chains be saturated. It is believed that unsaturation of a portion of either or both of the alkyl chains in the feed stocks will make the compounds less susceptible to separation by interferring with these relationships that produce an adsorbent selectivity for a desired isomer thereby making separation possible. Because relative basicity varies with the lengths of alkyl chains it is also preferred in the process of this invention to use feed stocks containing isomers having an equal number of carbon atoms per molecule. it is more preferable to use isomers having as their only differences the location of the alkyl substituted groups in a para-, meta-, or ortho-position. Isomers may have alkyl chains which are both normal or both branched or one branched and one normal.

The feed stocks may also contain small quantities of nonaromatics such as straight or branched chain paraffins, cycloparaffins, or olefinic materials. Since these materials, especially olefins, may reduce the selectivity of the adsorbent for the desired aromatic isomer, these contaminants should preferably be less than about 20 vol. percent of the feed stock passed into the process.

Since most of the commercial interest is in the $C_8$ aromatics and in particular para-xylene, feed stocks containing the xylene isomers and ethylbenzene are particularly preferred for the process of this invention. $C_8$ aromatic-containing feed stocks from which xylenes are recovered are, generally speaking, either extracted or non-extracted. Extracted feeds are those $C_8$ aromatic extracts which have been produced by a typical solvent extraction process from a pyrolysis gasoline or from a naphtha which has been reformed with a platinum catalyst. Such extracted feed stocks are essentially free of nonaromatic hydrocarbons. Non-extracted feed stocks include $C_8$ aromatic cuts of hydrogenated pyrolysis naphtha or reformates prepared by fractionation without solvent extraction and which therefore contain varying amounts of nonaromatic hydrocarbons. Such feed stocks whether extracted or non-extracted will be essentially olefin-free. Shown in Table 1 is an analysis of a typical non-extracted reformate $C_8$ heartcut in which $C_8$ nonaromatics amount of 2.3 wt. percent. Likewise the effluent from a catalytic xylene isomerization process also contains varying amounts of these $C_8$ nonaromatics. Table 2 shows the amounts of individual $C_8$ nonaromatics contained in a typical xylene isomerization reactor effluent and their respective normal boiling points. Here the total $C_8$ non-aromatics amount to 8.52 percent.

TABLE 1

| Typical Non-Extracted Reformate $C_8$ Heartcut Analysis | |
|---|---|
| M.S. Hydrocarbon Breakdown, wt. % | |
| Aromatics | |
| $C_8$ | 73.2 |
| $C_9$ | 0.3 |
| | 73.5 |
| Paraffins | |
| $C_6$ | 0.1 |
| $C_7$ | 0.2 |
| $C_8$ | 2.1 |
| $C_9$ | 20.7 |
| $C_{10}$ | 0.8 |
| | 23.9 |
| Monocyclo Paraffins | |
| $C_6$ | 1.0 |
| $C_7$ | 1.2 |
| $C_8$ | 0.2 |
| $C_9$ | 0.2 |
| | 2.6 |
| TOTAL | 100.0 |

TABLE 2

Individual C$_8$ Nonaromatic Components in a Typical
Xylene Isomerization Reactor
Effluent and Their Normal Boiling Points

| C$_8$ Paraffins | Wt. % in Reactor Effluent | Normal Boiling Point, °F. |
|---|---|---|
| 2,4-dimethylhexane | 0.33 | 229.0 |
| 2,3-dimethylhexane | 0.33 | 240.1 |
| 2-methylheptane | 0.63 | 243.8 |
| 4-methylheptane | 0.90 | 243.9 |
| n-octane | 0.33 | 258.2 |
|  | 2.52 |  |
| C$_8$ Naphthenes |  |  |
| 1,1,3-trimethylcyclopentane | 0.42 | 220.8 |
| 1,trans-2,cis-4-trimethylcyclopentane | .48 | 228.7 |
| 1,trans-2,cis-3-trimethylcyclopentane | .12 | 230.4 |
| 1,1,2-trimethylcyclopentane | .18 | 237.7 |
| 1,cis-2,trans-4-trimethylcyclopentane | .12 | 242.1 |
| 1,cis-2,trans-3-trimethylcyclopentane | .12 | 243.5 |
| 1,1-dimethylcyclohexane | .36 | 247.2 |
| 1,trans-4-dimethylcyclohexane | .90 | 246.8 |
| 1,cis-3-dimethylcyclohexane |  | 248.2 |
| 1-methyl,cis-3-ethylcyclopentane | .42 | 250.0 |
| 1-methyl,trans-3-ethylcyclopentane | 1.02 | 250.0 |
| 1-methyl,trans-2-ethylcyclopentane |  | 250.2 |
| 1-methyl,4-ethylcyclopentane |  | — |
| 1,cis-2,cis-3-trimethylcyclopentane | .30 | 253.4 |
| 1,trans-2-dimethylcyclohexane |  | 254.2 |
| 1,trans-3-dimethylcyclohexane | .42 | 256.0 |
| 1,cis-4-dimethylcyclohexane |  | 255.8 |
| isopropylcyclopentane | .24 | 259.6 |
| 1-methyl,cis-2-ethylcyclopentane | .12 | 262.5 |
| 1,cis-2-dimethylcyclohexane | .12 | 265.5 |
| ethylcyclohexane | .66 | 269.2 |
|  | 6.00 |  |
| Aromatics |  |  |
| Toluene | — | 231.1 |
| ethylbenzene | — | 277.1 |
| p-xylene | — | 281.0 |
| m-xylene | — | 282.4 |
| o-xylene | — | 291.9 |

As will be further explained below, these C$_8$ nonaromatics can cause fractionation difficulties when toluene is used as a desorbent for para-xylene separation.

Other specific representative compounds which can be utilized as feed stocks include those containing the various isomers of methylethylbenzene, diethylbenzene, isopropyltoluene, the methylpropylbenzenes, ethylpropylbenzenes, methylbutylbenzenes, ethylbutylbenzenes, dipropylbenzenes, diisopropylbenzenes and methylpentylbenzenes. The above list only represents a small fraction of feed stocks which can be separated by selections of specific adsorbents, desorbent materials, and alcohol substrates. Such feed stocks can be derived from many areas within petrochemical and petroleum processing plants.

The selectively adsorbed component is commonly referred to as the extract component of the feed stock and for purposes of this specification is referred to as the para-isomer since that isomer is selectively adsorbed when utilizing adsorbents described herein. In some instances there may be two or more para-isomers adsorbed by the adsorbent such as in cases where there are mixtures of different molecular weight feed stocks. The raffinate materials are typically the non-selectively adsorbed feed components. For example, in a feed stock comprising para-xylene along with meta-xylene, ethylbenzene and ortho-xylene, the latter three isomers are considered to be raffinate materials. The raffinate materials are generally described as what remains within the non-selective pore volume of the adsorbent particles after the para-isomer has been selectively adsorbed from the feed stock by the adsorbent.

Desorbent materials are generally defined as those materials which are capable of displacing para-isomers from the adsorbent to allow the recovery of the para-isomer. Desorbent materials are generally carefully selected so that desorption of the adsorbed para-isomer can be achieved with reasonable mass flow rates and also so that the desorbent can in turn be replaced by the para-isomer in a subsequent adsorption step.

Desorbents which can be used in the process of this invention should also be materials that are easily separable from components in the feed mixture which are passed into the process. In desorbing the para-isomer of the feed both desorbent and the para-isomer are removed from the adsorbent in admixture. Without a method of separation in these two materials, the purity of the para-isomer product would not be very high since it would be diluted with desorbent. It is therefore contemplated that a suitable desorbent have a sufficiently different boiling range from components of the feed mixture to permit a simple separation by fractionation or other methods to remove the para-isomer product from the desorbent and to allow reuse of the desorbent in the process.

As disclosed in my U.S. Pat. Nos. 3,558,732 and 3,686,342 toluene and diethylbenzene have been found to be particularly preferred desorbents for the separation of para-isomers and especially for the separation of para-xylene. Other desorbent materials which can be used for particular para-isomer separations include the $C_8$ aromatics, paraffins, cycloparaffins or chlorinated or sulfonated hydrocarbons. Mixtures of aromatic hydrocarbons with nonaromatics such as paraffins may also be used as desorbents. It is contemplated that desorbents having both higher and lower boiling points in the feed stocks can be utilized. Although we are not primarily concerned in this application with this manner of desorption, gaseous materials such as nitrogen, hydrogen, methane, ethane, etc., could also be used as desorbent materials where the desorption operation takes place by a purging step.

The desorbent toluene is primarily suited to an extracted $C_8$ aromatic feed stock which is essentially free of nonaromatic hydrocarbons. Feed stocks such as non-extracted $C_8$ reformate heartcuts or isomerization process effluents, both of which contain significant amounts of $C_8$ nonaromatics, can create problems in the fractionation of toluene desorbent from the raffinate and extract streams. When carbon numer aromatics higher than $C_8$ aromatics are to be separated there is generally no problem associated with the use of the toluene desorbent. The boiling points are sufficiently different to permit easy separation of the toluene.

In the absence of $C_8$ nonaromatics, the separation of the desorbent toluene from the selectively adsorbed feed component (usually para-xylene) and from the less selectively adsorbed feed components (the other $C_8$ aromatics) is easily accomplished because of the 40° to 50° F. difference in their boiling points as shown in Table 2 above. In commercial practice the raffinate fractionator is generally operated such that a small amount of desorbent is left in the bottoms product to prevent accumulation of contaminant $C_8$ material in the circulating desorbent. As to the extract fractionator operation, however, desorbent in the bottoms product would reduce the purity of the para-xylene product. Therefore, a sharp separation leaving little or no desorbent in the bottoms product is desired. These separations in the raffinate and extract fractionators are rather easily achieved in the absence of $C_8$ nonaromatics.

The presence of $C_8$ nonaromatics in the feed stock makes the separations more difficult which can result in accumulation of $C_8$ nonaromatics in the circulating desorbent and contamination of the para-xylene product. The mechanism by which such accumulation and contamination might occur is as follows. In the presence of high concentrations of aromatics, the $C_8$ nonaromatics are more volatile than indicated by their normal boiling points. As an approximation the paraffins will behave as if their boiling points were about 20° lower than the true values; the naphthenes will behave as if their boiling points were about 12° lower. Thus, these $C_8$ nonaromatics now have apparent boiling points closer to the desorbent. None of these $C_8$ nonaromatics are significantly adsorbed by the adsorbent in the presence of aromatics and after the feed stock contacts the adsorbent they will therefore appear in the feed to the raffinate fractionator along with the desorbent and the less selectively retained $C_8$ aromatics. Now any $C_8$ nonaromatics which are put into the raffinate fractionator overhead stream because of apparent boiling points close to that of the desorbent will accumulate in the desorbent and will be carried as part of the desorbent back to the adsorbent chamber. Part of them will appear in the feed to the extract fractionator and some of these, because of increased fractionation difficulty will then appear as a contaminant in the para-xylene product.

One solution is to use a desorbent that has a boiling point sufficiently higher than the $C_8$ aromatics (such as diethylbenzene) to permit easy separation from the $C_8$ aromatics. Raffinate and extract would then be taken overhead from their respective fractionators and desorbent would be taken out the fractionator bottoms. Desorbent costs and utility costs are, however, higher than when a light desorbent is employed and the heavier desorbent itself is not as efficient as is the light desorbent. Other solutions offered include various fractionation schemes to sharply split between the $C_8$ nonaromatics and one or more desired $C_8$ aromatic isomers. Studies have shown, however, that such solutions are not economically attractive.

A desorbent which would be ideal both from the standpoint of availability and because of its relatively low boiling point (80° C. compared to 110° C. for toluene) is benzene. Attempts to use it as a desorbent both undiluted and diluted have failed. This is due to the fact that when benzene is present in the adsorbent at high concentrations the selectivity for para-xylene with respect to the other $C_8$ aromatics is virtually destroyed. I have found, however, that certain alcohols added to the adsorbent as a substrate counteract the deleterious effects of benzene and allow its use in dilute form as a desorbent.

Although adsorption and desorption conditions can be both liquid and vapor phase, the liquid phase operation is preferred because of the lower temperature requirements and the slightly improved selectivities associated with the lower temperatures. Temperature ranges which can be used in adsorption can vary from about 40° C. up to about 250° C. Pressures which can be ued in the process include those in the range of above about atmospheric to about 500 psig. or higher. It is preferred to use pressures below 500 psig. in order to reduce the cost of the equipment. Higher pressure operations do not appear to affect the selectivity to a measurable amount. Desorption conditions can include the same range of temperatures and pressures as described for adsorption operations and, for the process of our invention, will preferably be the same as adsorption conditions. The desorption of the selectively adsorbed isomer could, however, be effected at reduced pressures or elevated temperatures or both.

The flow schemes which can be utilized to effect the process of this invention specifically include batch-type fixed bed processes, the continuous simulated moving-bed systems and the moving bed systems. In particular, the process flow schemes can include systems in which a multiple of adsorbent chambers are utilized in sequence with alternate passage of feed desorbent materials through the individual chambers to allow a relatively continuous production of extract material. Preferable processing flow schemes which can be utilized to effect the process of this invention include what is known in the art as the simulated moving-bed countercurrent systems. These systems include flow schemes similar to that described in U.S. Pat. No. 2,985,589 issued to D. B. Broughton. This patent generally describes the processing sequences involved in a simulated moving-bed countercurrent solid-fluid contacting process. In fact, the processing sequences generally described in that patent are the preferred modes of operating the separation process disclosed herein.

In adsorptive separation processes an important if not absolutely necessary adsorbent characteristic is its ability to separate components of the feed; or in other words, the selectivity, B, of the adsorbent for one component as compared to another component. The higher the selectivity is, the more efficient is the separation. The selectivity, B, as used throughout this specification is defined as the ratio of two components of the adsorbed phase over the ratio of the same two components of the adsorbed phase over the ratio of the same two components in the unadsorbed phase at equilibrium conditions and is expressed in equation form in equation 1 below:

Equation 1

Selectivity $= B_{C/D} =$ (Vol. percent C/Vol. percent D) A/(Vol. percent C/Vol. percent D) U where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent, or in other words, there was no net transfer of material occurring between the unadsorbed and adsorbed phases when the selectivity of the two selected components was measured.

As can be seen when the selectivity of two components approaches unity there is no preferential adsorptive of one component by the adsorbent. As the absolute value of B becomes greater than unity there is a preferential selectivity by the adsorbent of one component. When comparing the selectivity of component C over component D, a B larger than unity indicates preferential adsorption of component C within the adsorbent while a B less than unity would indicate that component D is preferentially adsorbed leaving an unadsorbed phase richer in component C and adsorbed phase richer in component D. Desorbents ideally would have a selectivity equal to about 1 or slightly less than one.

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not strictly suitable since the separation of isomers is dependent on electrochemical attraction of different isomer configurations rather than pure physical size differences the isomer molecules.

In hydrated form, the crystalline aluminosilicates generally encompass those zeolites represented by the formula 2 below:

Formula 2

$$M_{2/n}O : Al_2O_3 : wSiO_2 : yH_2O$$

where "M" is a cation which balances the electrovalence of the tetrahedra and is generally referred to as an exchangeable cationic site, "n" represents the valence of the cation, "w" represents the moles of $SiO_2$ and "y" represents the moles of water. The cations may be any one of a number of cations which will hereinafter be described in detail.

The type X structured and type Y structured zeolites as used in this specification shall include crystalline aluminosilicates having a three dimensional interconnected cage structures and can specifically be defined by U.S. Pat. Nos. 2,882,244 and 3,130,007. The terms "type X structured" and "type y structured" zeolites shall include all zeolites which have a general structure as represented in the above two cited patents and specifically including those structured containing various cations exchanged upon the zeolite. In the most limiting sense these terms refer to type X and type Y zeolites.

The type X structured zeolites can be represented in terms of mole oxides as represented in formula 3 below:

Formula 3

$$(0.9 \pm 0.2)M_{2/n}O : Al_2O_3 : (2.5 \pm 0.5)SiO_2 : yH_2O$$

where "M" represents at least one cation having a valence of not more than 3, "n" represents the valence of "M" and "y" is a value up to about 9 depending upon the identity of "M" and the degree of hydration of the crystalline structure.

The type Y structured zeolites can be represented in terms of the mole oxides for the sodium form as represented by formula 4 below:

Formula 4

$$(0.9 \pm 0.2)Na_2O : Al_2O_3 : wSiO_2 : yH_2O$$

where "w" is a value of greater than about 3 up to 8, and "y" may be any value up to about 9.

Adsorbents contemplated herein include not only the sodium form of the type Y zeolite but also crystalline materials obtained from such a zeolite by partial or complete replacement of the sodium cation with other individual cations or groups of cations. Similarly, the type X zeolite also may be ion-exchanged.

Cationic or base exchange methods are generally known to those familiar with the field of crystalline aluminosilicate production. They are generally performed by contacting the zeolite with an aqueous solution of the soluble salts of the cation or cations desired to be placed upon the zeolite. The desired degree of exchange takes place before the sieves are removed from the aqueous solution, washed and dried to a desired water content. It is contemplated that cation exchange operations of the cation exchange may take place using individual solutions of desired cations placed on the zeolite or using an exchange solution containing a mixture of cations, where two or more desired cations placed on the zeolite or using an exchange solution containing a mixture of cations, where two or more desired to be placed on the zeolite.

The cations which may be placed upon the zeolite include cations selected from, but not limited to, the Group IA, Group IIA and Group IB metals. Specific cations which show a preferential selectivity for para-xylene with respect to ethylbenzene include lithium, sodium, potassium, rubidium, cesium, beryllium, magnesium, calcium, strontium, barium, silver, manganese, cadmium, and copper. These cations should be used in an adsorptive separation process in which para-xylene and ethylbenzene are desired to be separated. In instances where the above cations were used, para-xylene would be the preferentially adsorbed component of the feed mixture. In the process of this invention I have found that a type X or type Y zeolite containing barium as the selected cation is particularly preferred.

The following combination of cations have been shown to be particularly well suited for a para-xylene and ethylbenzene separation. These cations include potassium and barium, potassium and beryllium, potassium and manganese, rubidium and barium, cesium and barium, copper and cadmium, copper and silver, zinc and silver, and copper and potassium.

Cations which have shonw a preferential selectivity of para-xylene with respect to meta-xylene and ortho-xylene include potassium, barium, sodium, and silver along with the certain cation pairs including potassium and barium, potassium and beryllium, potassium and magnesium, potassium and rubidium, potassium and cesium, barium and rubidium, cesium and barium, and copper and potassium.

When singular cations are based exchanged upon a zeolite the singular cations can comprise anywhere from 5 up to 75 wt. percent on a relative volatile free basis of the zeolite depending upon the molecular weight of the material exchanged upon the zeolite. It is contemplated that when single ions are placed upon the zeolite that they may be on the zeolite in concentrations of from about 1 percent to about 100 percent of the original cations present (generally sodium or calcium) upon the zeolite prior to its being ion-exchanged. By knowing the empirical formula including the silica to alumina ratio of the zeolite used, its water content and type zeolite used whether it be a type X or type y structured zeolite and the precentage of binder used if any, it is possible to calculate the percentage of ion exchange that has taken place.

When two or more cations are placed upon the zeolite there are two parameters in which one can operate in order to effectively produce a zeolite having the maximum selective properties. One of the parameters is the extent of the zeolite ion exchange which is determined by the length of time, temperature, and ion concentration. The other parameter is the ratio of individual cations placed on the zeolite. In instances in which the cation pairs comprise a Group IIA metal and a Group IA metal the weight ratio of these two components upon the zeolite can vary anywhere from about less than one up to about one hundred depending upon the molecular weight of the Group IIA or Group IA metal.

For the process of this invention I have found that another particularly useful zeolite adsorbent is one which contains barium and potassium cations having a weight ratio of barium to potassium of from about 1 to 100 or even higher. Such an adsorbent is described in detail in my U.S. Pat. No. 3,663,368, which is incorporated herein by specific reference thereto. Furthermore, I have found that the effect of an alcohol substrate on para-isomer selectivity, especially para- to -ethylbenzene selectivity, generally increases with increasing Ba/K ratio of the adsorbent. For the process of this invention therefore it is preferred that the Ba/K weight ratio be no less than 5 and more preferably 10 or higher.

Equilibrium adsorption conditions as defined herein include operations in which essentially all the desorbent material which is contained within adsorbent prior to being contacted with a feed stream is displaced from the adsorbent by the subsequent contact with the feed material. This results in an adsorbent which contains essentially no desorbent material after adsorption has taken place. In displacing a desorbent material from an adsorbent, equilibrium adsorption conditions are attained when the feed stream which has contacted the adsorbent feed contains essentially no desorbent material and is of the same composition as the feed passed into the adsorbent bed indicating no net transfer of material into or out of the adsorbent.

Less than equilibrium adsorption conditions are defined as those operations in which desorbent remains within the adsorbent while the feed mixture is being adsorbed within the adsorbent. Less than equilibrium adsorption conditions can generally be achieved by contacting an adsorbent with a feed mixture which contains desorbent material or by contacting an adsorbent which contains desorbent with a desorbent-free feed stream and only displacing a portion of the desorbent from the adsorbent.

I have found that when a hydrocarbon feed stream is contacted at either equilibrium adsorption conditions or less than equilibrium conditions with certain para-isomer-selective adsorbents containing an alcohol substrate that the adsorbent selectivity for the para-isomer increases significantly. This increase may make possible a reduction in the amount of adsorbent needed to achieve a specific isomer separation from a particular type and charge rate of feed stock.

The term substrate as used in this specification has, in one sense, its usual meaning of any substance acted upon; it can be thought of here as a substance acted upon by the aromatic isomers. Additionally in this specification it has the broad meaning of any modifying or activating substance. In this context, it is a substance which modifies certain adsorbent characteristics. The term has both of these meanings because the exact mechanism by which certain alcohols increase the adsorbents selectivity for the para-isomer is not fully understood. It is thought that certain alcohols modify the acidity/basicity relationships that exist among certain adsorbents and both feed and desorbent materials that contact such adsorbents, and by this means effect isomer selectivities.

Preferred alcohols for use as substrates are saturated alcohols which are soluble in the feed and desorbent and which boil in about the same range as that of the particular desorbent employed or which form azeotropes with the desorbent. Alcohol substrates do not appear to be permanent on the adsorbent and it is therefore desired that they be as easily separable from the feed components as is the desorbent material. The more preferred alcohols are those having from 1 to about 6 carbon atoms per molecule except those such as 2-butanol which readily dehydrate to form olefins. The term "stable alcohols" as used herein shall mean those saturated alcohols which do not readily dehydrate to form olefins. The most preferred alcohols are those containing 3 or 4 carbon atoms per molecule. Of these, 1-butanol, and 2-methyl-1-propanol are especially preferred. The alcohol substrate may be added to the adsorbent either on an intermittent or continuous basis by itself or in admixture with feed or desorbent material to maintain the desired concentration of the substrate on the adsorbent. The preferred concentration is from about 0.1 to 8.0 wt. percent of the adsorbent.

The effects of various desorbents and alcohol substrates are particularly noticeable in continuous counter-current simulated moving-bed processes in which less than equilibrium adsorption conditions are present. In these type processes a continuous production of an extract stream rich in the selectively adsorbed component of the feed and a raffinate stream depleted in the selectively adsorbed component of the feed requires that less than equilibrium adsorption conditions take place. The basic flow scheme for these type processes are disclosed in U.S. Pat. No. 2,985,589.

In order to reduce the contamination of extract and raffinate streams when employing the general flow patterns disclosed in U.S. Pat. No. 2,985,589, a desorbent material is employed as a flushing or rectification material between the adsorption and desorption zones. In the counter-current flow process previously described, the solid is first contacted with the feed stream in an adsorption zone after which the solid is removed from the adsorption zone and then contacted with a liquid generally comprising desorbent to remove any raffinate material contained in the adsorbent and between the particles of adsorbent. The solid, after leaving the rectification or flushing zone, then contains substantially no raffinate material adsorbed or retained between the particles of the molecular sieve except of course for the desorbent material and is passed into a desorption zone. There the adsorbent is contacted with a higher concentration and quantity of desorbent material which displaces the selectively adsorbed component of the feed from the molecular sieve and allows recovery of an extract stream comprising desorbent and the selectively adsorbed component of the feed. The solid leaving the desorption zone contains adsorbed within the molecular sieve and contained between the particles of the molecular sieve essentially pure desorbent and after leaving the desorption zone passes into a second rectification or flushing zone. In this zone the solid molecular sieve adsorbent is contacted with a small portin of raffinate material from the next adsorption zone to remove a portion of the desorbent from between the particles of the molecular sieve adsorbent. The molecular sieve is then passed into an adsorption zone wherein the feed contacts the molecular sieve and the entire cycle of events described above are repeated.

In general most countercurrent operations are effected using a series of alternate zones which extend in a connected series. One aspect of the continuous countercurrent flow separation process is that the operation of this type flow system is continuous. This means that a set of adsorption and desorption zones with the related rectification or flushing zones are generally stacked in a manner so as to allow continuous closed-loop operation to take effect with the continuous production of raffinate and extract streams and a continual use of feed and desorbent materials.

In the countercurrent flow operations there is generally no equilibrium adsorption taking place. This is primarily due to the fact that a quantity of desorbent is generally present within the molecular sieve adsorbent in the adsorption zone during the period of time when feed material is contacting the adsorbent. The feed material is not able to totally remove the desorbent from the solid adsorbent located within the adsorption zone. Consequently, the effects of desorbent material and substrate on the selectivity of the adsorbent become pronounced and require the selection of both a desorbent and substrate which do not adversely alter the adsorbent's ability to retain a given component of the feed.

Although testing techniques employing both equilibrium and less than equilibrium adsorption conditions can be used in evaluating and selecting different adsorption systems, those employing less than equilibrium conditions are especially useful to measure the selectivities of various adsorbents and to determine the effect of various alcohol substrates on the selectivities of particular adsorbents.

The pulse test, conducted with a dynamic testing apparatus, was one such technique which employed less than equilibrium adsorption conditions. The dynamic testing apparatus consisted basically of a chamber having inlet and outlet parts at opposite ends of the chamber. The chamber was contained within a temperature control heating system and included pressure control equipment such that the chamber could be operated at constant temperature and pressure. Attached to the outlet line connected to the outlet of the chamber was chromographic analysis equipment to analyze the effluent leaving the adsorbent chamber.

The pulse test was performed using this apparatus and the following general procedure to determine selectivities and other data for various adsorbent systems. The adsorbent was filled to equilibrium with a particular desorbent by passing the desorbent through the adsorbent chamber. At a convenient time a pulse of feed containing known concentrations of a non-adsorbed paraffinic tracer (n-nonane) and of $C_8$ aromatic isomers all diluted in desorbent was injected for a duration of several minutes. Desorbent flow was resumed, and the tracer and the $C_8$ aromatics were eluted in the sequence n-nonane, m-xylene, o-xylene, ethylbenzene and p-xylene as in liquid-solid chromatographic operation. The effluent was analyzed by on-stream chromatographic equipment and traces of the envelopes of corresponding component peaks were developed.

From information derived from the chromatographic traces adsorbent performance can be rated in terms of the selectivity, B, for p-xylene with respect to the other $C_8$ aromatics. Selectivity, B, for para-xylene with respect to the other $C_8$ aromatics (p/EB, p/m, p/o) is the ratio of the distance between the center of the p-xylene peak envelope and the $C_9$ tracer peak envelope to the corresponding distances for ethylbenzene, m-xylene and o-xylene.

Translating this type of data into the practical aromatic separation processes required actual testing of the best systems in a countercurrent liquid-solid contacting device. The general operating principles of such a device have been previously described and are found in Broughton U.S. Pat. no. 2,985,589. A specific laboratory-size apparatus utilizing these principles is described in DeRosset et al U.S. Pat. No. 3,706,812. In that apparatus the adsorbent is contained in 24 separate modules connected in series. The feed and desorbent streams are continuously introduced via annular chambers around the value shaft, through the value shaft, to the valve face and the extract and raffinate are continuously withdrawn in a similar fashion.

Test results using this apparatus and a bariumcontaining type X or type Y zeolite to separate aromatic isomers confirmed the increased para-isomer selectivity when employing an alcohol substrate as shown in the pulse test.

ILLUSTRATIVE EXAMPLES AND DESCRIPTION OF THE DRAWING

The following two examples of pulse test results demonstrate the beneficial effect of an alcohol substrate on a particular adsorbent. The examples are intended to specifically demonstrate the feasibility of employing the process of my invention to separate various aromatic isomers and is not intended to be a limitation of the scope of this invention, but rather a specific illustration.

The adsorbent employed in the pulse tests was a type X crystalline aluminosilicate containing barium and potassium at the exchangeable cationic sites within the adsorbent. The adsorbent was essentially totally ion exchanged and contained a weight ratio of elemental barium over elemental potassium of about 8.6. Physical and chemical analyses of the adsorbent are given in Table 3 below:

Table 3

| | Adsorbent Analyses | |
|---|---|---|
| Chemical:* | | |
| | BaO, wt. % | 25.6 |
| | $K_2O$, wt. % | 3.2 |
| | $Na_2O$, wt. % | 0.7 |
| | $Al_2O_3$, wt. % | 29.2 |
| | $SiO_2$, wt. % | 41.0 |
| Physical: | | |
| | Surface Area, $m^2$/gm | 415 |
| | Pore Vol., cc/gm | 0.24 |
| | Apparent Bulk Density, gm/cc | 0.835 |

*Based on volatile-free adsorbent.

Pulse tests were obtained using a 70 cc adsorbent bed contained in a 6 ft. × ⅜ inch coiled copper pipe. The particular process chromatograph was equipped with a 10 ft. 1/16 inch ID packed capillary column. The column packing consisted of 1.5 percent Bentone 34, 1.5 percent dinonylphthalate on 80–100 mesh acid washed silanized Chromosorb W. The analytical column was run isothermally at 165° F. and the elution peaks detected with a hydrogen flame ionization unit. The effluent was sampled automatically at uniform intervals ranging from 2to 3.5 minutes. Operating conditions were 1 LHSV, 165° C., 100 psig, and 10 minute feed pulse duration. The presence of desorbent within the adsorbent during adsorption of the para-isomer feed component emphasized the effect of desorbent on the performance of the adsorbent system and characterized the adsorption conditions as "less than equilibrium" as previously defined.

EXAMPLE I

Figure 1:
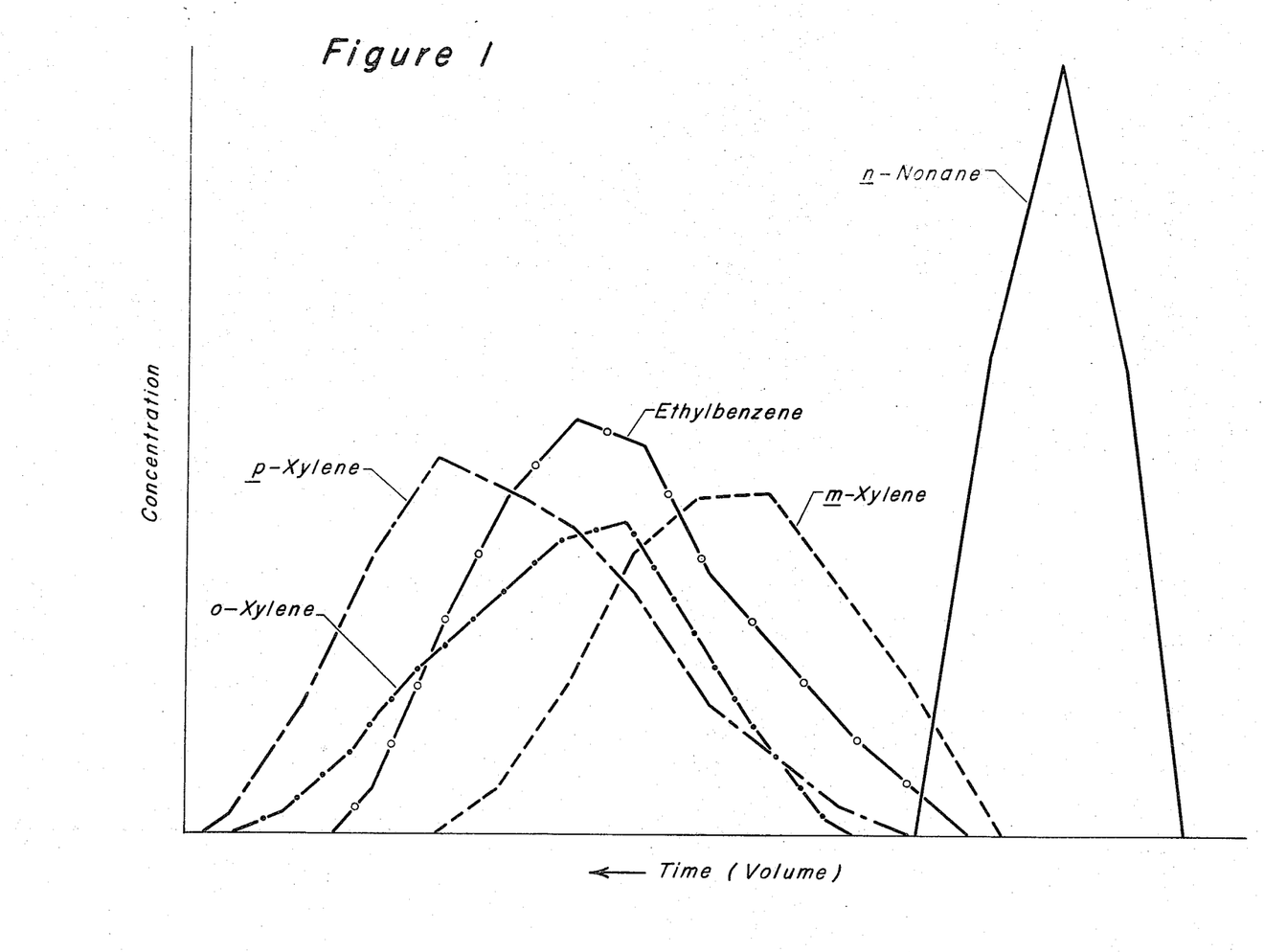

In this example the adsorbent described in Table 1 was placed in the dynamic testing apparatus and first contacted with a desorbent blend of 20 percent benzene in iso-octane (2,2,4-trimethylpentane). The adsorbent was then contacted with a pulse of feed mixture containing 5percent each of the $C_8$ aromatics and 5 percent n-nonane as a tracer all diluted in the desorbent blend. The diluent iso-octane was used in both desorbent and feed blends to facilitate ease of chromatographic analysis. The effluent stream was analyzed by chromatographic equipment and the trace of the individual peak envelopes for n-nonane, ethylbenzene, para-, meta-, and ortho-xylene is shown in FIG. 1. The ordinate represents concentration and the abscissa represents time. Para-xylene selectivities were calculated from the peak envelopes in the manner as explained above and the results are shown in Table 4 below:

Table 4

| Selectivities using Diluted Benzene as Desorbent Selectivities: | |
|---|---|
| p-xylene/ethylbenzene | 1.22 |
| p-xylene/m-xylene | 1.81 |
| p-xylene/o-xylene | 1.17 |

EXAMPLE II

In this example the desorbent blend of Example I above contained 1 vol. percent of 1-butanol and the procedure, adsorbent, and feed blend were otherwise the same as those of Example I. The chromatographic trace of the components in the effluent from the test appartus is shown as FIG. 2 and the selectivities calculated from the peak envelopes are shown in Table 5:

Table 5

| Selectivities using 1-Butanol Substrate and Diluted Benzene as Desorbent | |
|---|---|
| Selectivities: | |
| p-xylene/ethylbenzene | 3.01 |
| p-xylene/m-xylene | 4.19 |
| p-xylene/o-xylene | 3.79 |

Figure 2:
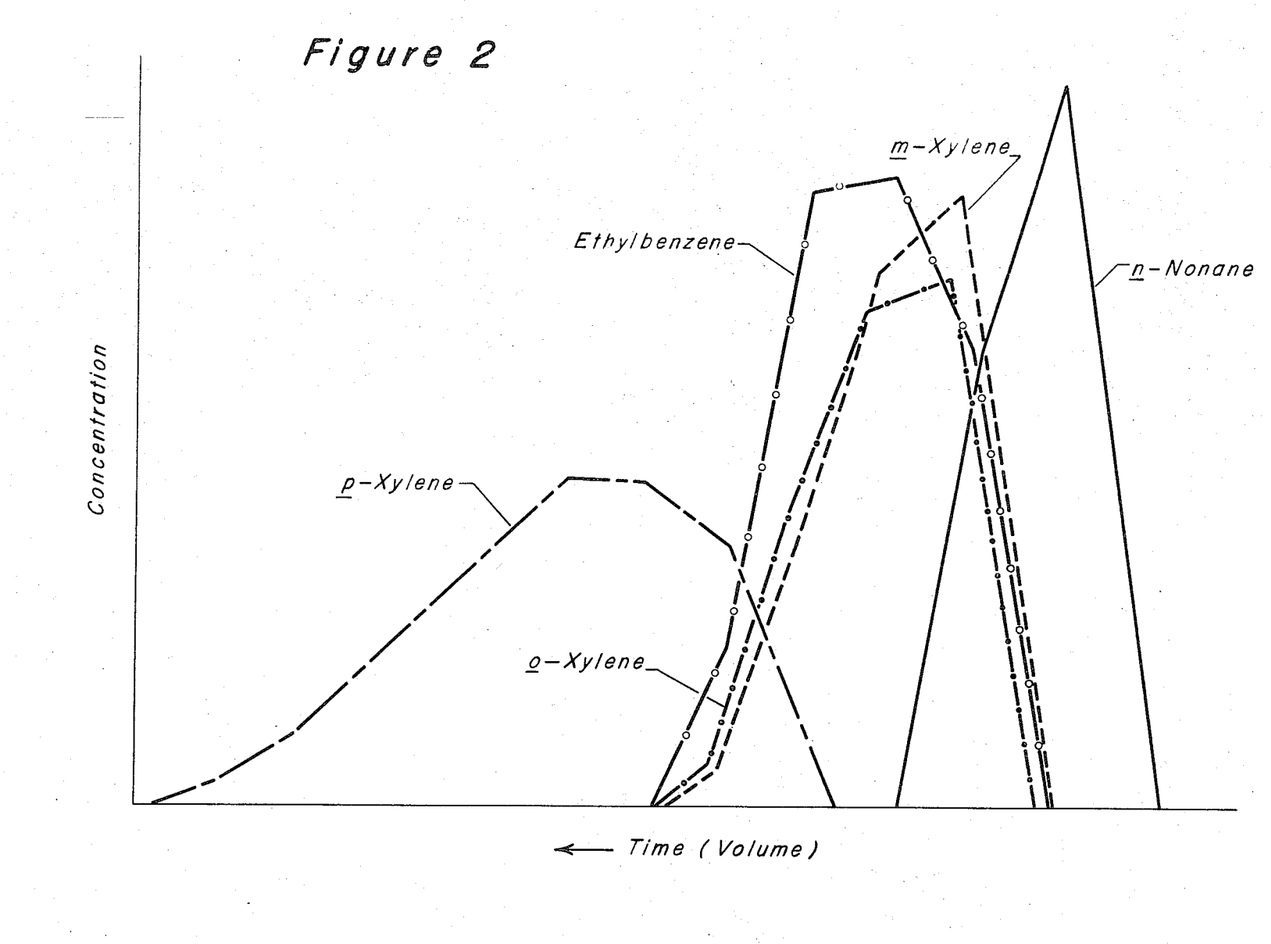

Note that the selectivities shown in Table 5 have more than doubled from those of Example I shown in Table 4. FIG. 1 shows that although separation of para-xylene from the other isomers is apparent, ethylbenzene and ortho-xylene are less cleanly separated from para-xylene. FIG. 2 by comparison shows the cleaner separation of para-xylene which resulted when 1-butanol was used as a substrate in the same system. The increased para-selectivity with respect to the other $C_8$ aromatics made possible by the method of this invention will make possible the separation and recovery of high purity paraxylene at high recovery.

I claim as my invention:

1. A process for separating the para-isomer from a feed comprising a mixture of bi-alkyl substituted monocyclic aromatic isomers, including the para-isomer, which process comprises contacting said mixture with a crystalline aluminosilicate adsorbent containing barium at exchangeable cationic sites within the adsorbent crystalline structure and additionally containing, during sid contacting, from about 0.1 to about 8.0 wt. percent of an alcohol at adsorption conditions to effect the selective adsorption of said para-isomer by said adsorbent and recovering from said adsorbent a stream concentrated in said para-isomer.

2. The process of claim 1 further characterized in that said adsorbent is selected from the group consisting of type X and type Y structured crystalline aluminosilicates.

3. The process of claim 2 further characterized in that said aromatic isomers contain from 8 to about 18 carbon atoms per molecule.

4. The process of claim 3 further characterized in that said alcohol is soluble in the feed.

5. The process of claim 4 further characterized in that said adsorption conditions include a temperature within the range of from about 10° C. to about 250° C. and a pressure within the range of from about atmospheric to about 500 psig.

6. In an adsorptive separation process for the separation of the para-isomer from a hydrocarbon feed comprising a mixture of bi-alkyl substituted mono-cyclic aromatic isomers, including the para-isomer, which process comprises the steps of:
  a. contacting the feed, at adsorption conditions, with a crystalline aluminosilicate adsorbent selected from the group consisting of type X and type Y zeolites containing a selected cation or cations at the exchangeable cationic sites within said zeolite, thereby adsorbing the para-isomer of the feed;
  b. withdrawing from the bed of solid adsorbent a stream comprising less selectively adsorbed components of the feed;
  c. contacting the adsorbent at desorption conditions with a desorbent material to effect the removal of the para-isomer from the desorbent; and,
  d. withdrawing from the adsorbent bed a stream comprising desorbent material and said para-isomer;
  THE IMPROVEMENT WHICH COMPRISES maintaining on the adsorbent, during the contacting of the feed therewith, from about 0.1 to about 8.0 wt. percent of an alcohol.

7. The process of claim 6 further characterized in that said aromatic isomer contains from 8 to about 18 carbon atoms per molecule.

8. The process of claim 6 further characterized in that zeolite contains at least one cation selected from the group consisting of sodium, barium, and potassium.

9. The process of claim 6 further characterized in that said desorbent material has a boiling point less than that of the hydrocarbon feed.

10. The process of claim 6 further characterized in that said desorbent material has a boiling point higher than that of the hydrocarbon feed.

11. The process of claim 6 further characterized in that said alcohol is soluble in the feed and desorbent material.

12. In a process for the separation of para-xylene from a feed containing a mixture of $C_8$ aromatic hydrocarbons, which process employs a crystalline aluminosilicate adsorbent selected from the group consisting of type X and type Y structured zeolites containing a selected cation or cations at the exchangeable cationic sites within said zeolite, said process comprising the steps of:
  a. contacting said adsorbent with said feed in the presence of a desorbent material at less than equilibrium adsorption conditions at which desorbent remains within the adsorbent while feed hydrocarbons are being adsorbed by the adsorbent, to effect the selective adsorption of para-xylene by the adsorbent;
  b. removing a raffinate material from said desorbent which contains the less selectively adsorbed components of the feed;
  c. contacting the adsorbent with a desorbent material at desorption conditions to effect the displacing of para-xylene from the adsorbent; and,
  d. removing from said adsorbent bed an extract material comrising desorbent material and para-xylene;
  THE IMPROVEMENT WHICH COMPRISES maintaining on the adsorbent, during the contacting of the feed therewith, from about 0.1 to about 8.0 wt. percent of an alcohol which is soluble in the feed and desorbent material.

13. The process of claim 12 further characterized in that said zeolite contains at least one cation selected from the group consisting of sodium, barium, and potassium.

14. The process of claim 12 further characterized in that said desorbent material has a boiling point less than that of the hydrocarbon feed.

15. The process of claim 12 further characterized in that said desorbent material has a boiling point higher than that of the hydrocarbon feed.

16. The process of claim 12 further characterized in that said alcohol is selected from the group consisting of stable $C_3$ alcohols and $C_4$ alcohols.

17. In an adsorptive separation process for the separation of para-xylene from a hydrocarbon feed containing a mixture of $C_8$ aromatic isomers wherein a desorbent material is used which has a lower boiling range than the $C_8$ aromatic hydrocarbons of said feed which process comprises the steps of:
  a. contacting said feed with a crystalline aluminosilicate adsorbent selected from the group consisting of type X and type Y zeolites containing barium at the exchangeable cationic sites within said zeolite in the presence of desorbent material at less than equilibrium adsorption conditions thereby allowing a competitive but selective adsorption of para-xylene with respect to the desorbent for the adsorptive sites on the adsorbent;
  b. removing a raffinate material from said adsorbent which contains the less selectively adsorbed components of the feed;
  c. contacting the adsorbent with a desorbent material at desorption conditions to effect displacing of para-xylene from the adsorbent; and,
  d. removing from said adsorbent bed an extract material comprising desorbent material and para-xylene; THE IMPROVEMENT WHICH COMPRISES maintaining on the adsorbent, during the contacting of the feed therewith, from about 0.1 to about 8.0 wt. percent of an alcohol soluble in the feed and desorbent material and selected from the group consisting of stable $C_3$ and $C_4$ alcohols.

18. The process of claim 17 further characterized in that said desorbent material comprises benzene.

19. The process of claim 17 further characterized in that the alcohol substrate is 1-butanol.

* * * * *